(12) United States Patent
Yu et al.

(10) Patent No.: US 11,772,462 B2
(45) Date of Patent: Oct. 3, 2023

(54) VEHICLE-WINDOW GLASS ASSEMBLY AND METHOD FOR MANUFACTURING THE SAME

(71) Applicant: SAINT-GOBAIN GLASS FRANCE, Courbevoie (FR)

(72) Inventors: Buyin Yu, Shanghai (CN); Xinqiao Gao, Shanghai (CN); Xiaobing Xu, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 148 days.

(21) Appl. No.: 17/441,983

(22) PCT Filed: Apr. 13, 2020

(86) PCT No.: PCT/CN2020/084379
§ 371 (c)(1),
(2) Date: Sep. 22, 2021

(87) PCT Pub. No.: WO2020/211715
PCT Pub. Date: Oct. 22, 2020

(65) Prior Publication Data
US 2022/0176785 A1 Jun. 9, 2022

(30) Foreign Application Priority Data

Apr. 15, 2019 (CN) .......................... 201910298785.8

(51) Int. Cl.
*B60J 1/10* (2006.01)
*B29C 45/14* (2006.01)
(Continued)

(52) U.S. Cl.
CPC ........... *B60J 1/10* (2013.01); *B29C 45/14467* (2013.01); *B29C 45/14819* (2013.01);
(Continued)

(58) Field of Classification Search
None
See application file for complete search history.

(56) References Cited

U.S. PATENT DOCUMENTS

| 9,079,480 B1 | 7/2015 | Williams |
| 2010/0237644 A1 | 9/2010 | Senge |
| 2014/0028048 A1 | 1/2014 | Kornexl |

FOREIGN PATENT DOCUMENTS

| CN | 101652260 A | 2/2010 |
| CN | 101754843 A | 6/2010 |

(Continued)

OTHER PUBLICATIONS

International Search Report as issued in International Patent Application No. PCT/CN2020/084379, dated Jul. 8, 2020.
(Continued)

*Primary Examiner* — Alexander S Thomas
(74) *Attorney, Agent, or Firm* — Pillsbury Winthrop Shaw Pittman LLP

(57) ABSTRACT

A vehicle-window glass assembly includes a vehicle-window glass and its injection-molded encapsulation; and an over-molded bolt including a base, a thread rod and an injection-molded part. One end of the thread rod is fixedly connected to the base, and the injection-molded part covers at least a part of the base. The injection-molded encapsulation covers at least a part of the injection-molded part such that the over-molded bolt and the vehicle-window glass are fixed to each other, and a material of the injection-molded part has a tensile strength greater than that of a material of the injection-molded encapsulation. This vehicle-window glass assembly can b e adapted to various vehicle models with a large gap between a surface of a vehicle-window glass and a vehicle-door sheet metal on which the vehicle-window glass requires to be mounted.

10 Claims, 3 Drawing Sheets

(51) Int. Cl.
*B29K 21/00* (2006.01)
*B29K 709/08* (2006.01)
*B29L 31/30* (2006.01)

(52) U.S. Cl.
CPC .... *B29K 2021/003* (2013.01); *B29K 2709/08* (2013.01); *B29L 2031/30* (2013.01)

(56) References Cited

FOREIGN PATENT DOCUMENTS

| | | | |
|---|---|---|---|
| CN | 102145980 | A | 8/2011 |
| CN | 102781868 | A | 11/2012 |
| CN | 104828868 | A | 8/2015 |
| CN | 105984190 | A | 10/2016 |
| CN | 105291792 | B | 3/2018 |
| CN | 207128588 | U | 3/2018 |
| CN | 108099554 | A | 6/2018 |
| EA | 025305 | B1 | 12/2016 |
| EP | 0 296 213 | A1 | 12/1988 |
| JP | H08-112832 | A | 5/1996 |
| KR | 910000326 | B1 | 1/1991 |
| RU | 2673304 | C2 | 11/2018 |
| WO | WO 88/04985 | A1 | 7/1988 |
| WO | WO 2015/129758 | | 9/2015 |

OTHER PUBLICATIONS

Second Office Action as issued in Chinese Patent Application No. 201711477227.5, dated Feb. 8, 2022.
Office Action as issued in Eurasian Patent Application No. 201990444, dated Dec. 17, 2021.
First Examination Report as issued in Indian Patent Application No. 202017018647, dated Jan. 3, 2022.
Office Action and Search Report as issued in Russian Patent Application No. 2021120395, dated Dec. 20, 2021.
Office Action and Search Report as issued in Russian Patent Application No. 2021121577, dated Dec. 20, 2021.
Examination Report as issued in Indian Patent Application No. 202117043928, dated Jun. 6, 2023.

VEHICLE-WINDOW GLASS ASSEMBLY AND METHOD FOR MANUFACTURING THE SAME

CROSS-REFERENCE TO RELATED APPLICATIONS

This application is the U.S. National Stage of PCT/CN2020/084379, filed Apr. 13, 2020, which in turn claims priority to Chinese patent application number 201910298785.8 filed Apr. 15, 2019. The content of these applications are incorporated herein by reference in their entireties.

FIELD OF THE INVENTION

The present disclosure relates to the technical field of vehicle-window glass manufacturing, in particular, to a vehicle-window glass assembly and a method for manufacturing the same.

BACKGROUND OF THE INVENTION

At present quarter-windows are mounted on many vehicles. Some quarter-windows mount in the front of some vehicles so as to widen the drivers' field of vision, thereby avoiding unclear vision in the presence of other vehicles passing by either side. Some quarter-windows mount in the rear of some vehicles so as to increase sunlight in vehicles. These quarter-windows are generally fixed to vehicle-door sheet metals by bolts.

Vehicle manufacturers generally choose to mount these quarter-windows by tightening nuts on bolts at a final stage of a vehicle assembly line, thus glass manufacturers are required to over-mold one or more bolts in an injection-molded encapsulation of quarter-window glass, and the injection-molded encapsulation is required to meet a minimum torque requirement (for example, 5 Nm to 6 Nm) so as to avoid damage when nuts are screwed.

However, for some vehicle models, there is a large gap (for example, greater than 10 mm) between the surface of a quarter-window glass and the vehicle-door sheet metal on which the quarter-window glass requires to be mounted. Common standard bolts cannot meet this requirement, glass surface cannot be changed due to specific design style, and the vehicle-door sheet metal cannot be changed considering feasibility of stamping process. In addition, although the injection-molded encapsulation is commonly injected with PVC (polyvinyl chloride), other specific materials are required to use to form the injection-molded encapsulation in some vehicle manufacturers because of appearance or function requirements, such as materials with a less tensile strength (for example, TPE (thermoplastic elastomer), of which the elongation at break is about twice that of PVC, but the tensile strength is less than half that of PVC, is difficult to meet the torque requirement when nuts are screwed therefor).

In order to solve the problems mentioned above, several proposals have been proposed in the prior art. For example, increasing the length of the bolt is proposed so as to overcome the above-mentioned large gap. However, due to limitation of assembly space, the longer bolt cannot be used in some vehicle models.

Further, increasing the thickness of injection-molding material for covering the base of the bolts is proposed so as to "lift" the bolt relatively to the glass surface, thereby reducing the distance between the base of the bolt and the vehicle-door sheet metal. However, increasing the thickness of the injection-molding material (such as TPE) will cause shrinkage of the injection-molded encapsulation after injection molding, which will affect positioning accuracy of the bolt.

SUMMARY OF THE INVENTION

In order to overcome the above-mentioned defects in the prior art, a first aspect of the present disclosure provides a vehicle-window glass assembly, which comprises: a vehicle-window glass and its injection-molded encapsulation; and an over-molded bolt comprising a base, a thread rod and an injection-molded part. One end of the thread rod is fixedly connected to the base, and the injection-molded part covers at least a part of the base. The injection-molded encapsulation covers at least a part of the injection-molded part such that the over-molded bolt and the vehicle-window glass are fixed to each other, and material of the injection-molded part has a tensile strength greater than that of material of the injection-molded encapsulation.

According to a preferred embodiment of the present disclosure, the injection-molded part comprises a positioning portion for positioning the over-molded bolt on a surface of the vehicle-window glass, and the positioning portion extends outward from the base in an opposite direction to the thread rod and protrudes out from a bottom surface of the injection molded part.

According to a preferred embodiment of the present disclosure, the over-molded bolt further comprises a shim sleeved on the thread rod and abutting against the base.

According to a preferred embodiment of the present disclosure, material of the shim is rubber or plastic.

According to a preferred embodiment of the present disclosure, the material of the injection-molded part is PP (polypropylene), PA (polyamide), ABS (acrylonitrile-butadiene-styrene) or PC/ABS (copolymers and mixtures of polycarbonate and acrylonitrile-butadiene-styrene).

According to a preferred embodiment of the present disclosure, glass fiber is added to the material of the injection-molded part.

According to a preferred embodiment of the present disclosure, at least one through-hole is formed in the injection-molded part for filling the material of the injection-molded encapsulation.

According to a preferred embodiment of the present disclosure, the material of the injection-molded encapsulation is TPE.

The second aspect of the present disclosure provides a method for manufacturing the vehicle-window glass assembly according to the first aspect of the present disclosure, which comprises following steps: A) fixedly connecting the base and the thread rod to each other and placing them into a first injection mold; B) injecting a first injection-molding material into the first injection mold to form the injection-molded part that covers at least a part of the base to obtain the over-molded bolt, and demolding the obtained over-molded bolt from the first injection mold; C) positioning the obtained over-molded bolt and the vehicle-window glass with each other by point contact and placing them into a second injection mold; D) injecting a second injection-molding material into the second injection mold to form the injection-molded encapsulation that covers at least a part of the injection-molded part to obtain the vehicle-window glass assembly.

According to a preferred embodiment of the present disclosure, the method further comprises a step of priming on a surface of the injection-molded part of the obtained over-molded bolt, prior to step C).

Compared with the prior art, the vehicle-window glass assembly according to the present disclosure has following advantages.

1) as the over-molded bolt is obtained by a first injection molding on a basic bolt structure, and the injection-molded encapsulation of the vehicle-window glass is then obtained by a second injection on the obtained over-molded bolt and the vehicle-window glass, the vehicle-window glass assembly according to the present disclosure "lifts" the bolt relative to the glass surface, thus enabling it to be adapted to various vehicle models with a large gap between the surface of the vehicle-window glass and the vehicle-door sheet metal on which the vehicle-window glass requires to be mounted;

2) as the first injection-molding material has a tensile strength greater than that of the second injection-molding material, overall mechanical strength of the vehicle-window glass assembly according to the present disclosure has been improved by combining these two injection-molding materials, thus enabling it to meet the minimum torque requirement when in case that vehicle manufacturers require to use a material with a less tensile strength to form the injection-molded encapsulation of the vehicle-window glass;

3) although the injection-molded encapsulation of the vehicle-window glass assembly according to the present disclosure has a large thickness, since the injection-molded part of the over-molded bolt covered by injection-molded encapsulation has a large tensile strength, thus the injection-molded encapsulation will hardly shrink after injection, ensuring positioning accuracy of the over-molded bolt relative to the vehicle-window glass; and 4) in addition, the method for manufacturing the vehicle-window glass assembly is not complicated, and some specific injection-molding materials (such as PP and TPE) can be self-adhesive with each other without priming process, thus the vehicle-window glass assembly has low economic cost and man-hour cost, and can be widely applied to various vehicle models.

BRIEF DESCRIPTION OF THE DRAWINGS

Other features and advantages of the present disclosure will be better understood through the following preferred embodiments described in detail with reference to the accompanying drawings, in which the same reference numerals indicate the same or similar components.

DETAILED DESCRIPTION OF EMBODIMENTS

The implementation and usage of the embodiments are discussed in detail below. However, it should be understood that the specific embodiments discussed are merely intended to illustrate specific ways of implementing and using the present disclosure, and are not intended to limit the protection scope of the present disclosure.

It is noted that the drawings not only are used for the explanation and description of the present disclosure, but also are helpful for the definition of the present disclosure when necessary.

Figure 1:
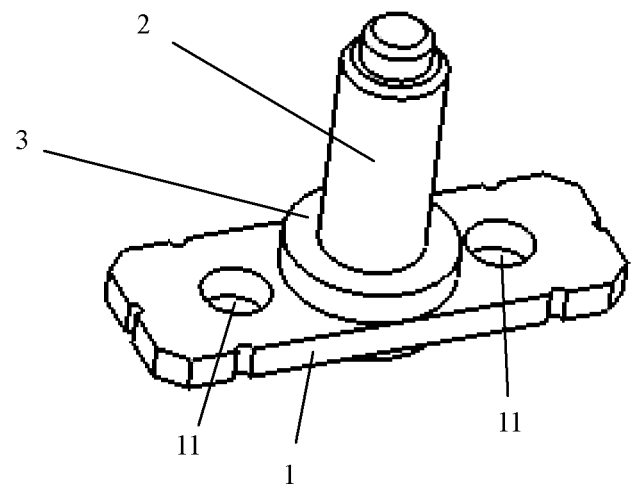
FIG. 1 is a schematic perspective view of a basic bolt structure of a vehicle-window glass assembly according to the present disclosure.
Figure 2:
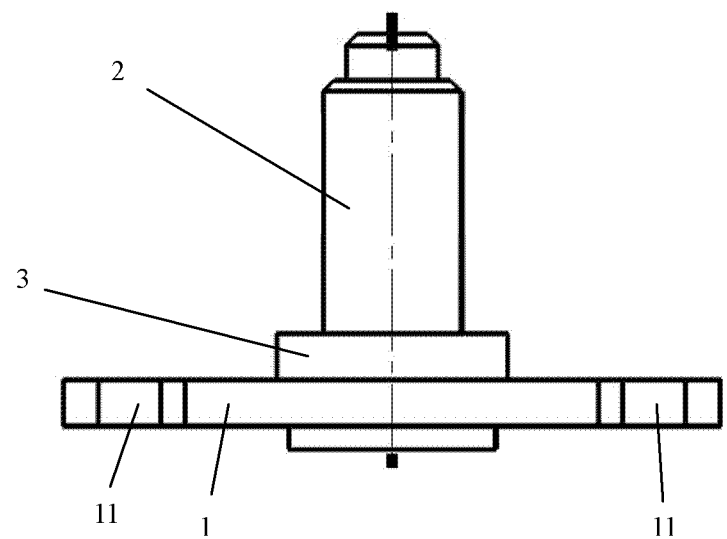
FIG. 2 is a schematic sectional view of the basic bolt structure according to FIG. 1.

FIG. 1 is a schematic perspective view of a basic bolt structure of a vehicle-window glass assembly according to the present disclosure, and FIG. 2 is a schematic sectional view of the basic bolt structure according to FIG. 1. As shown in the figures, the basic bolt structure includes a base 1 and a thread rod 2, and one end of the thread rod 2 is fixedly connected to the base 1. The base 1 and the thread rod 2 may both be made of steel material and are fixed to each other, for example, by riveting or the like. Apparently, the base 1 and the thread rod 2 may be designed to integrate, so as to facilitate manufacturing.

In the illustrated embodiment, the base 1 is a steel plate having a thickness approximately between 1.5 mm and 2.5 mm, and the steel plate is provided with positioning holes 11 (by way of example, the figures show two positioning holes 11 that are symmetrical with respect to the center of the steel plate), so that making the positioning parts disposed in the injection mold pass through the positioning holes 11, ensuring the base 1 be accurately positioned in the injection mold and cannot be rotated relative to the injection mold.

The thread rod 2 is substantially perpendicular to the steel plate, and one end of the thread rod 2 is fixedly connected to a substantially central position of the steel plate, and the other end is configured to pass through a fixing hole provided in a vehicle-door sheet metal and can be fixed to the vehicle-door sheet metal by screwing a nut. The type of the thread rod 2 can be determined according to actual requirements, for example, M5, M6 or the like.

In addition, in order to prevent corrosion, the surfaces of the base 1 and the thread rod 2 may be electroplated. Material of electroplated coatings is generally PF Zn (Plating Zn) or PF Zn Ni (Plating Zn Ni).

Preferably, the basic bolt structure may further include a shim 3 sleeved on the thread rod 2 and abutting against the base 1. Material of the shim 3 is rubber, soft plastic, or hard plastic, so as to increase sealing property during injection and prevent injection-molding material from leaking through threads.

Figure 3:
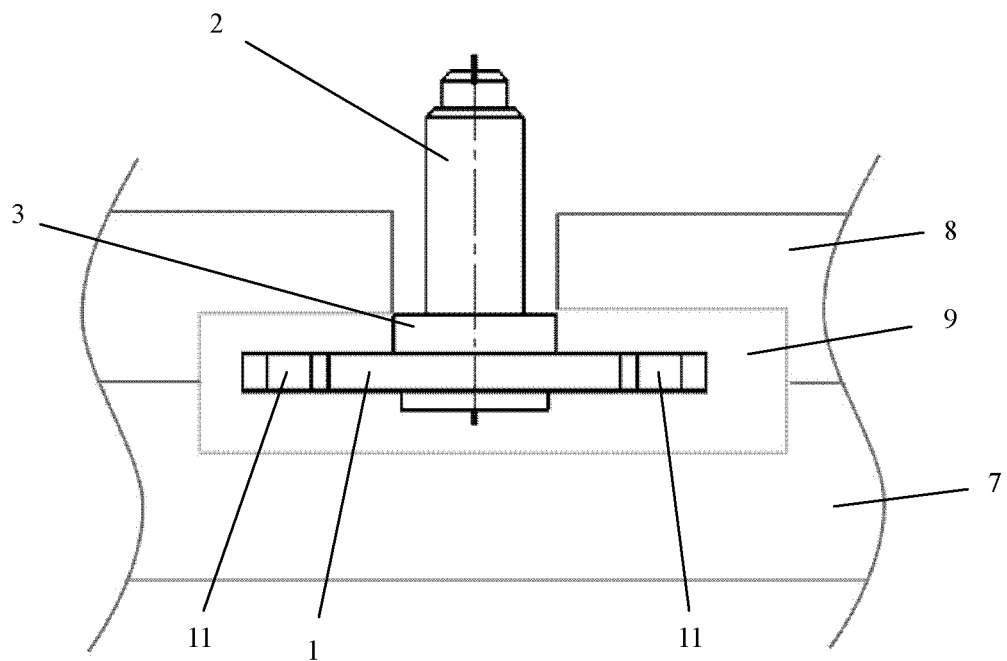
FIG. 3 is a schematic sectional view of the basic bolt structure according to FIG. 1 placed in a first injection mold.

FIG. 3 is a schematic view of the basic bolt structure according to FIG. 1 placed in a first injection mold. As shown in the figure, the injection area 9 of the first injection mold is defined by a cavity mold 7 and a core mold 8. The base 1 and the shim 3 of the basic bolt structure are integrally placed in the injection area 9, so that an injection-molded part 4 (shown in FIGS. 5 and 6) that covers at least a part of the base 1 can be formed by performing a first injection, thereby an entire over-molded bolt can be obtained.

Material of the injection-molded part 4 is generally hard plastic, such as PP, PA, ABS or PC/ABS, or the like. If vehicle manufacturers require to use a soft plastic to form the injection-molded encapsulation of the vehicle-window glass, a combination of hard plastic and soft plastic can increase the mechanical strength of the vehicle-window glass assembly, thereby meeting the minimum torque requirement when a nut is screwed. In fact, the material of the injection-molded part 4 may be any injection-molding material having a tensile strength greater than that of the material of the injection-molded encapsulation and being suitable for manufacturing the over-molded bolt. Preferably, glass fiber may be added to the material (for example, PP, PA) of the injection-molded part 4 to further increase the mechanical strength.

Figure 4:
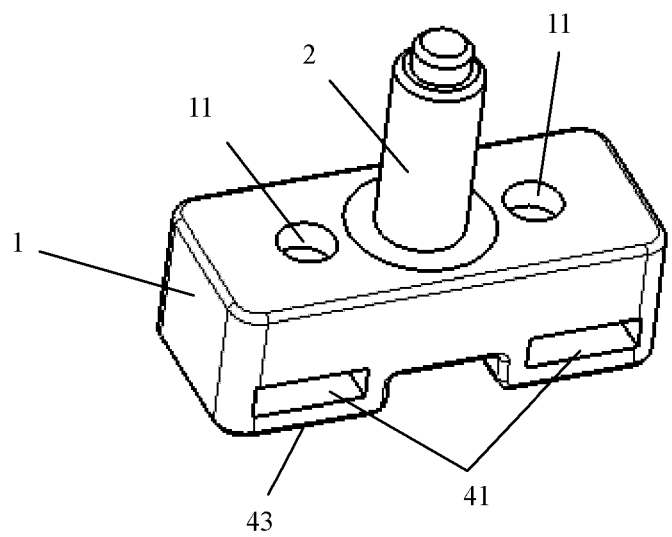
FIG. 4 is a schematic perspective view of an over-molded bolt including the basic bolt structure according to FIG. 1.
Figure 5:
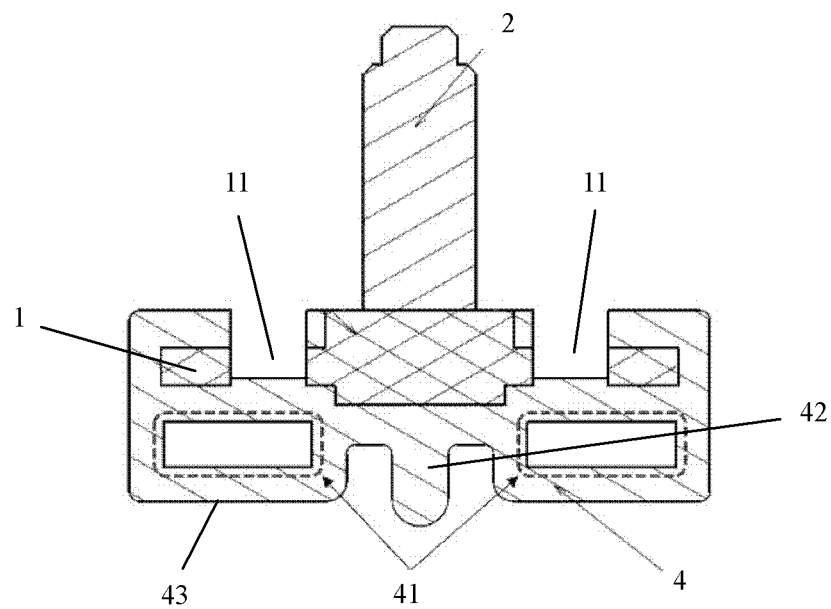
FIG. 5 is a schematic sectional view of the over-molded bolt according to FIG. 4.

FIG. 4 is a schematic perspective view of an over-molded bolt including the basic bolt structure according to FIG. 1, and FIG. 5 is a schematic sectional view of the over-molded bolt according to FIG. 4. As shown in the figures, the injection-molded part 4 of the over-molded bolt covers at least a part of the base 1. Preferably, except for the positions of the positioning holes 11, the injection-molded part 4 substantially completely covers the base 1. In addition, the injection-molded part 4 comprises a positioning portion 42 for positioning the over-molded bolt on a surface of the vehicle-window glass during a second injection, and the positioning portion 42 extends outward from the base in an opposite direction to the thread rod 2 1 and protrudes out from a bottom surface 43 of the injection-molded part, so as to form a point contact with the surface of the vehicle-window glass. As shown in FIG. 5, the bottom surface 43 refers to the surface of the injection-molded part that is in contact with the glass.

More specifically, in the illustrated embodiment, the positioning portion 42 and the thread rod 2 are located on two opposite sides on the plate-shaped base 1, respectively. The positioning portion 42 extends outward perpendicular to the base 1 from a position adjacent to the center of the base 1, and comprises a tip adapted to form a point contact with the surface of the vehicle-window glass.

Figure 6:
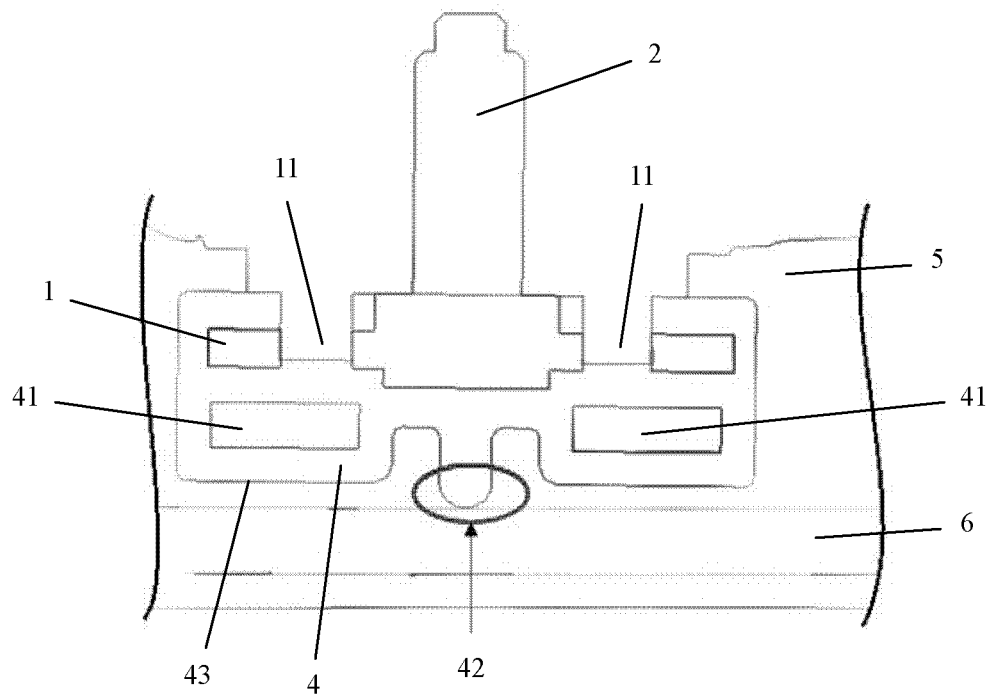
FIG. 6 is a schematic partial sectional view of an embodiment of the vehicle-window glass assembly according to the present disclosure, wherein the vehicle-window glass assembly includes the over-molded bolt according to FIG. 4.

FIG. 6 is a schematic partial sectional view of an embodiment of the vehicle-window glass assembly (generally a quarter-window glass assembly) according to the present disclosure. As shown in the figure, as the surface of the vehicle-window glass 6 generally has an irregular arc shape, the distance between the injection-molded part 4 and the vehicle-window glass 6 is not constant. Therefore, when the second injection is performed to form the injection-molded encapsulation 5 of the vehicle-window glass 6, the over-molded bolt and the vehicle-window glass 6 can be well positioned relative to each other by means of the point contact between the positioning portion 42 and the vehicle-windows glass 6. For a quarter-window glass assembly, the over-molded bolt is generally positioned at a corner of the quarter-window glass. The injection-molded encapsulation 5 covers at least a part of the injection-molded part 4 of the over-molded bolt. Preferably, except for the positions of the positioning holes 11, the injection-molded encapsulation 5 substantially completely covers the injection-molded part 4.

The material of the injection-molded encapsulation 5 may be soft plastic, such as TPE, according to the requirement of vehicle manufacturers. In case that the material of the injection-molded part 4 is PP and the material of the injection-molded encapsulation 5 is TPE, as PP and TPE are self-adhesive to each other, there is no need to apply a primer to the injection-molded part 4 before the second injection, thereby saving economic cost and man-hour cost. In case of selecting other materials, it can be determined according to the self-adhesive properties of the selected materials whether it is necessary to apply a primer to the injection-molded part 4 before the second injection. Apparently, the materials of the injection-molded part 4 and the injection-molded encapsulation 5 are not limited to the above examples. On the basis that the tensile strength of the material of the injection-molded part 4 is greater than that of the material of the injection-molded encapsulation 5, the materials of the injection-molded part 4 and the injection-molded encapsulation 5 may be any hard plastic and soft plastic suitable in appearance and function for manufacture of vehicle-window glass assembly. The tensile strength of the material of the injection-molded part 4 is preferably more than twice of that of the material of the injection-molded encapsulation 5, and more preferably more than three times of that of the material of the injection-molded encapsulation 5. For example, as for the material of injection-molding encapsulation 5, the tensile strength of TPE is approximately between 0.1 Mpa and 15 Mpa, such as approximately equal to 5 Mpa; while, as for the material of injection-molded part 4, the tensile strength of PP is approximately between 20 Mpa and 30 Mpa, the tensile strength of ABS is approximately between 35 Mpa and 50 Mpa, and the tensile strength of PA is approximately between 60 Mpa and 80 Mpa.

Preferably, at least one through-hole 41 may be formed in the injection-molded part 4 for filling the material of the injection-molded encapsulation 5. In the illustrated embodiment, two through-holes 41 are formed in the injection-molded part 4, respectively on two opposite sides relative to the positioning portion 42. The two through-holes 41 are through in a direction parallel to the plate-shaped base 1 and have a certain thickness, so as to be filled with the material of the injection-molded encapsulation 5 during the second injection, which further improves the contact between the injection-molded part 4 and the injection-molded encapsulation 5, and can avoid shrinkage phenomenon after injection if the thickness of the injection-molded encapsulation 5 is large. Therefore, the positioning accuracy of the over-molded bolt is improved.

A method for manufacturing the vehicle-window glass assembly according to the present disclosure is described below.

First, the base 1 and the thread rod 2 are fixedly connected to each other and the shim 3 is optionally sleeved on the thread rod 2 to form the basic bolt structure, then the assembled basic bolt structure is placed in the first injection mold, so that the base 1 and the shim 3 are integrally accommodated in the injection area 9 of the first injection mold, and the base 1 is accurately positioned in the first injection mold and is not rotatable relative to the first injection mold by putting the positioning parts disposed in the first injection mold through the positioning holes 11 of the base 1.

Then, the first injection-molding material (for example, hard plastic such as PP, PA, ABS, PC/ABS, and glass fiber is optionally added thereto) is injected into the first injection mold to form the injection-molded part 4 covering at least a part of the base (preferably, substantially completely covering the base), in order to obtain the over-molded bolt, then the obtained over-molded bolt is demolded from the first injection mold after cooling, and then it can be determined whether it is necessary to apply a primer to the injection-molded part 4 according to the self-adhesive properties of the selected materials. The above steps can be repeated according to actual requirements to obtain multiple over-molded bolts.

Then, the over-molded bolt and the vehicle-window glass 6 are positioned relative to each other by means of the positioning portion 42 of the injection-molded part 4 and are placed into the second injection mold, and then the base 1 is accurately positioned in the second injection mold and is not rotatable relative to the second injection mold by putting the positioning parts disposed in the second injection mold through the positioning holes 11 of the base 1.

Finally, the second injection-molding material (for example, soft plastic such as TPE) is injected into the second injection mold to form the injection-molded encapsulation 5 covering at least a part of the injection-molded part 4 (preferably, substantially completely covering the injection-molded part 4) and optionally filling the through-holes 41 provided in the injection-molded part 4, such that the over-molded bolt is firmly fixed to the vehicle-window glass, and the required vehicle-window glass assembly is obtained after cooling and demolding.

The technical content and technical features of the present disclosure have been disclosed above. However, it is conceivable that, under the creative ideas of the present disclosure, those skilled in the art can make various changes and improvements to the concepts disclosed above, but these changes and improvements all belong to the protection scope of the present disclosure. The description of the above embodiments is exemplary rather than limiting, and the protection scope of the present disclosure is defined by the appended claims.

The invention claimed is:

1. A vehicle-window glass assembly, comprising:
   a vehicle-window glass and its injection-molded encapsulation; and
   an over-molded bolt comprising a base, a thread rod and an injection-molded part, one end of the thread rod being fixedly connected to the base, and the injection-molded part covering at least a part of the base,
   wherein the injection-molded encapsulation covers at least a part of the injection-molded part such that the over-molded bolt and the vehicle-window glass are fixed to each other, and a material of the injection-molded part has a tensile strength greater than that of a material of the injection-molded encapsulation.

2. The vehicle-window glass assembly according to claim 1, wherein the injection-molded part comprises a positioning portion for positioning the over-molded bolt on a surface of the vehicle-window glass, and the positioning portion extends outward from the base in an opposite direction to the thread rod and protrudes out from a bottom surface of the injection molded part.

3. The vehicle-window glass assembly according to claim 1, wherein the over-molded bolt further comprises a shim sleeved on the thread rod and abutting against the base.

4. The vehicle-window glass assembly according to claim 3, wherein a material of the shim is rubber or plastic.

5. The vehicle-window glass assembly according to claim 1, wherein the material of the injection-molded part is PP (polypropylene), PA (polyamide), ABS (acrylonitrile-butadiene-styrene) or PC/ABS (copolymers and mixtures of polycarbonate and acrylonitrile-butadiene-styrene).

6. The vehicle-window glass assembly according to claim 5, wherein glass fiber is added to the material of the injection-molded part.

7. The vehicle-window glass assembly according to claim 1, wherein at least one through-hole is formed in the injection-molded part for filling the material of the injection-molded encapsulation.

8. The vehicle-window glass assembly according to claim 1, wherein the material of the injection-molded encapsulation is TPE (thermoplastic elastomer).

9. A method for manufacturing the vehicle-window glass assembly according to claim 1, the method comprising the following steps:
   A) fixedly connecting the base and the thread rod to each other and placing them into a first injection mold;
   B) injecting a first injection-molding material into the first injection mold to form the injection-molded part that covers at least a part of the base to obtain the over-molded bolt, and demolding the obtained over-molded bolt from the first injection mold;
   C) positioning the obtained over-molded bolt relative and the vehicle-window glass to each other by point contact and placing them into a second injection mold;
   D) injecting a second injection-molding material into the second injection mold to form the injection-molded encapsulation that covers at least a part of the injection-molded part to obtain the vehicle-window glass assembly.

10. The method according to claim 9, further comprising a step of priming on a surface of the injection-molded part of the obtained over-molded bolt, prior to step C).

\* \* \* \* \*